United States Patent [19]
Meeks et al.

[11] Patent Number: 5,347,589
[45] Date of Patent: Sep. 13, 1994

[54] SYSTEM AND METHOD FOR DISPLAYING HANDWRITING PARAMETERS FOR HANDWRITING VERIFICATION

[75] Inventors: M. Littleton Meeks, Lincoln; Theodore T. Kuklinski, West Newton, both of Mass.

[73] Assignee: Meeks Associates, Inc., Lincoln, Mass.

[21] Appl. No.: 80,680

[22] Filed: Jun. 22, 1993

Related U.S. Application Data

[63] Continuation of Ser. No. 783,566, Oct. 28, 1991, abandoned.

[51] Int. Cl.$^5$ ............................................. G06K 9/00
[52] U.S. Cl. ......................................... 382/3; 382/13; 178/18; 345/179
[58] Field of Search ............... 382/3, 13; 178/18; 340/706, 708, 712, 825.31, 825.33, 825.34; 345/104, 179

[56] References Cited

U.S. PATENT DOCUMENTS

| | | | |
|---|---|---|---|
| 3,955,178 | 5/1976 | Warfel | 340/825.34 |
| 4,318,096 | 3/1982 | Thornburg et al. | 340/706 |
| 4,344,135 | 8/1982 | Crane et al. | 382/3 |
| 4,646,351 | 2/1987 | Asbo et al. | 382/3 |
| 4,703,511 | 10/1987 | Conoval | 382/13 |
| 4,752,965 | 6/1988 | Dunkley et al. | 382/3 |
| 4,800,240 | 1/1989 | Béchet | 382/3 |
| 4,907,080 | 3/1990 | Campbell et al. | 382/3 |
| 5,077,802 | 12/1991 | Plamondon | 382/3 |
| 5,198,623 | 3/1993 | Landmeier | 178/19 |

*Primary Examiner*—Joseph Mancuso
*Assistant Examiner*—Steven P. Klocinski
*Attorney, Agent, or Firm*—Brian M. Dingman

[57] ABSTRACT

A system and method of displaying handwriting parameters in which a dynamic parameter, such as the tangential speed, of a stylus moving across a surface is determined, a trace of the stylus across the surface is recorded on a record member, and the dynamic parameter is represented on the record member to provide a means of visually observing both the handwriting itself and one or more dynamic parameters of the handwriting process.

34 Claims, 6 Drawing Sheets

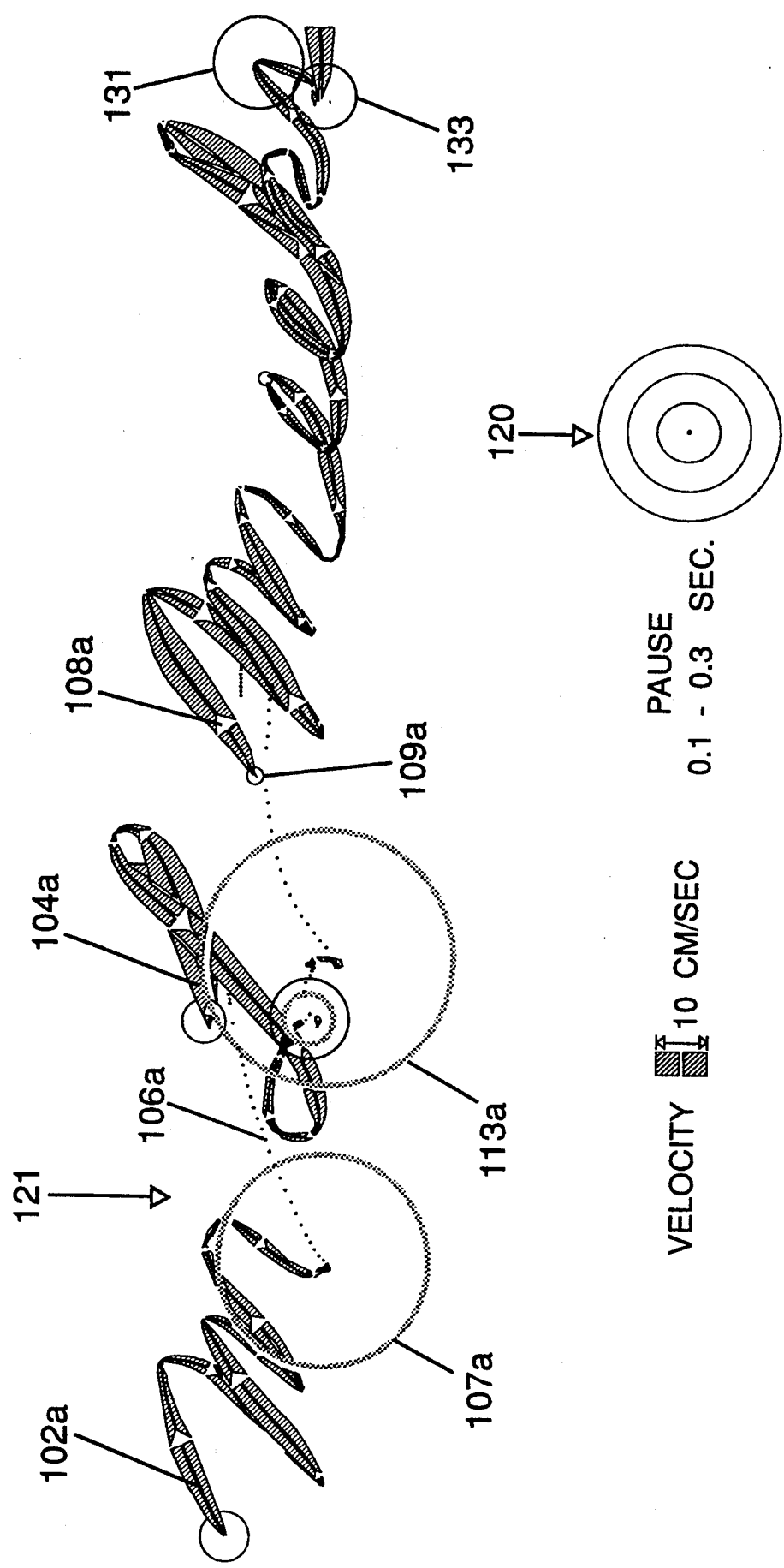

ers in which the pen speed is used to modulate an enve-
SYSTEM AND METHOD FOR DISPLAYING HANDWRITING PARAMETERS FOR HANDWRITING VERIFICATION This is a continuation of application Ser. No. 07/783,566, filed Oct. 28, 1992 now abandoned.

FIELD OF INVENTION

This invention relates to a system and method for displaying various parameters of handwriting to allow side by side comparison for verification purposes.

BACKGROUND OF INVENTION

There are many situations in which it is desirable to identify or verify a person's handwriting. It may be desirable to perform such verification in the presence of the person or remotely, for example as a means of controlling access to a computer system from remote locations. There are two basic approaches to such handwriting identification: automatic systems and methods which process data from a reference signature and a specimen signature, and report whether or not the specimen is verified; and comparison systems and methods whereby a stored reference signature and a specimen signature are displayed together to allow the validity of the specimen to be judged by an observer.

In known systems using the first approach, one system generates an analog signal proportional to the tangential pen speed across a surface. The system then internally correlates the signal to a reference signal and reports the degree of correlation. Another system provides automatic verification based on use of a pen having an accelerometer and a pressure sensor, in which the pen acceleration and pressure are used internally as the discriminants. Another system determines the X and Y components of pen speed and uses the magnitude of the differences in the velocity vectors as an internal discriminant.

Systems which provide a display of the specimen signature include a system that determines the axial pressure of the stylus on the writing surface and modulates the intensity of the display with the pressure. This system, however, does not display the speed of the stylus across the writing surface.

SUMMARY OF INVENTION

It is therefore an object of this invention to provide a system and method of displaying handwriting parameters in which the pen speed is used to modulate an envelope around the trace on the display.

It is a further object of this invention to provide such a system and method in which graphic representations of both the pen motion and one or more dynamic handwriting parameters are displayed.

It is a further object of this invention to provide such a system and method that allows for comparison of reference and specimen handwriting samples on the basis of both the appearance of the writing and the manner in which the writing is accomplished.

This invention results from the realization that a truly effective handwriting display system for allowing an operator to verify the source of the handwriting may be accomplished by representing on a record member such as a video monitor the trace of the handwriting along with one or more dynamic handwriting parameters to allow comparison of both the handwritten word and the method by which the user has accomplished the handwriting.

This invention features a system and method for displaying handwriting parameters, including determining a dynamic parameter of the trace of a stylus across a surface, such as the stylus tangential speed, recording on a record member a trace of the stylus across the surface, and representing on the record member along with the trace the dynamic parameter to provide a means of visually observing handwriting and the handwriting process. The record member may be accomplished with a video display device and/or a hard copy output. In one embodiment, the parameter is represented by modulating the width of an envelope around the trace, for example by increasing the width of the line symmetrically about the trace of the writing as the stylus speed increases. There may be included a provision for determining the pressure of the stylus on the surface, the location and durations of pauses of the stylus as it moves across the surface, the tilt of the stylus, and a determination of the motion of the stylus just above the surface. In each case there is some representation made on the record member of one or more of those parameters. For example, the stylus pressure may be represented by assigning display colors, or gray tones in monochrome output, to represent values of the parameter. Preferably, pauses are represented with a symmetric pattern around the pause locations. That pattern may be a circle whose radius is related to the duration of the pause. The motion of the pen just above the paper is preferably represented by a thin line without the symmetric broadened display associated with a parameter such as pen speed or pressure. Regular time intervals may be marked on the display with a marking pattern such as a line or arrowhead, which also indicates the direction of motion of the pen at that time. The broadened line may be outlined to indicate stylus direction in overlapping trace areas. There may also be a provision for representation of the trace and one or more resolved parameters of a previous stylus trace to allow side-by-side visual comparison of two handwriting samples.

DISCLOSURE OF PREFERRED EMBODIMENT

Other objects, features and advantages will occur to those skilled in the art from the following description of a preferred embodiment and the accompanying drawings, in which:

FIGS. 3A and 3B are examples of an output of the system and method of this invention showing a display for a valid signature and a forged signature, respectively, illustrating display parameters of this invention.

This invention provides a display of the trace of a stylus on a surface, along with a visual representation of one or more dynamic parameters of the writing. Each resolved handwriting parameter may be represented by any of the described display formats.

Figure 1:
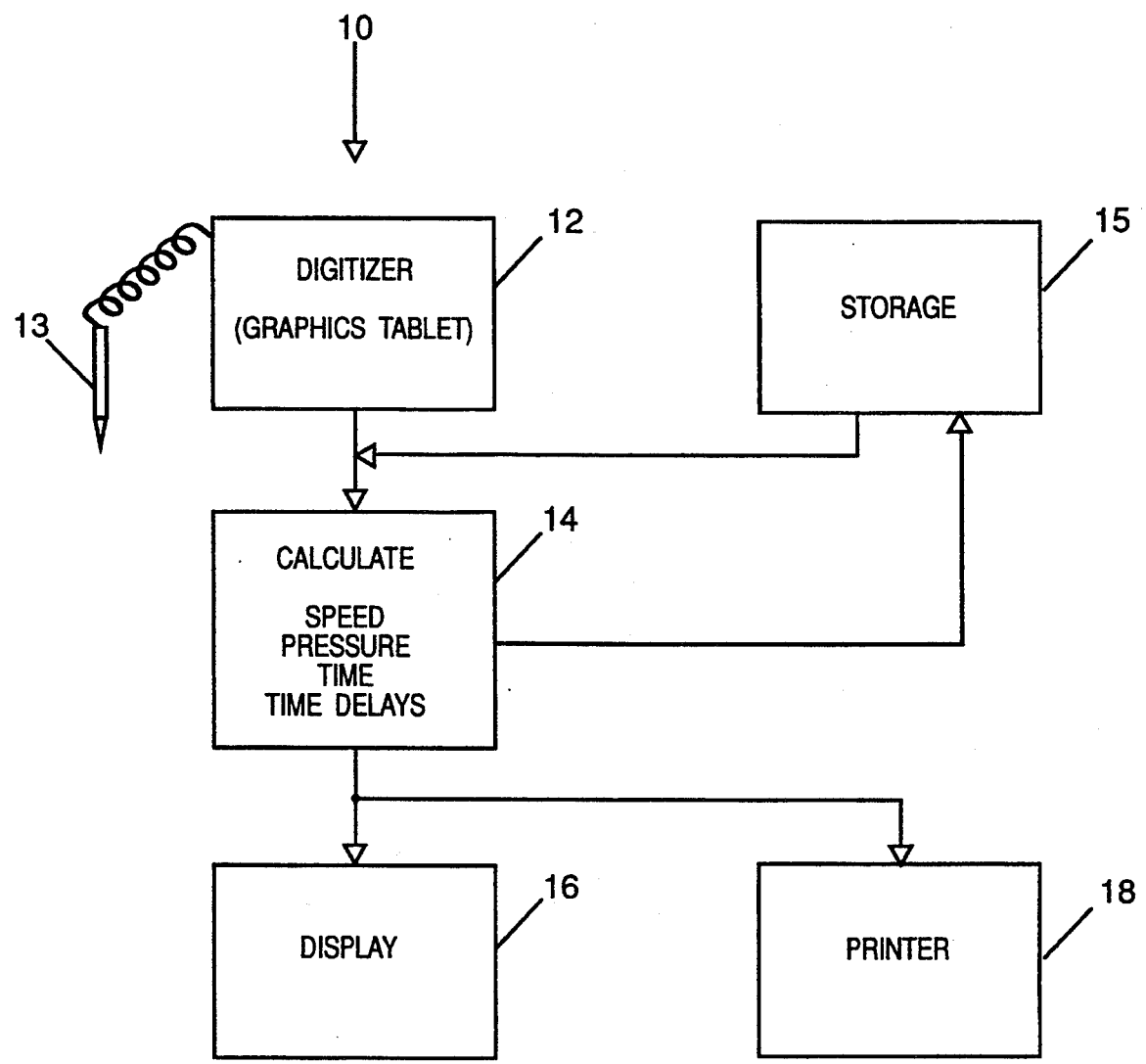
FIG. 1 is a schematic diagram of a system for accomplishing this invention.

There is shown in FIG. 1 a system 10 for accomplishing the handwriting display of this invention. Digitizer 12 samples the X and Y coordinates of stylus 13 across its surface, typically at rates between 50 and 200 samples per second. The stylus can be corded or not, and could be a user's finger in touch screen technology. Some such digitizers, for example those manufactured by Wacom Incorporated and by GTCO Corp., are also able to measure the axial pressure of stylus 13 against digitizer 12. Some such digitizers, for example those using electromagnetic digitizing technology, are able to sense the position of the tip of stylus 13 when it is near but not in contact with the tablet surface and hence there is no axial pressure on the surface. This information is provided to calculating module 14, which determines from the supplied information the tangential pen speed and the pen axial pressure, and relates those parameters to the elapsed time. The system also allows the calculation of time delays, or stylus pauses. The information may also be provided to storage 15 for later retrieval for comparison to another handwriting sample. Storage 15 may be accomplished in computer hardware or other memory devices, such as magnetic media that may be provided on a credit card for retrieval for signature verification purposes.

System 10 provides an output on video display 16 and/or printer 18 for a hard copy output. The display includes a recording of the trace of the stylus across the surface, and a representation of the tangential speed of the stylus as it moves across the surface. Preferably, the trace is shown with a thin line, and the width of an envelope symmetric around the line is modulated in proportion to the tangential speed of the stylus to provide a display of not only the handwriting but of a dynamic parameter (pen speed) of the handwriting to provide additional information for verification purposes. The display may also include a stored handwriting sample, similarly processed to display the trace and the same dynamic parameters, for side-by-side comparison.

The other measured parameters, such as axial pen pressure, pen tilt, and time, may also be displayed as desired. In one embodiment, the axial pressure may be used as the parameter that modulates the width of the display envelope. Alternatively, the speed or pressure parameter may be represented by assigning various colors of a color monitor, or gray tones in a monochrome monitor, to represent values of that dynamic parameter. This may be accomplished with a lookup table. Preferably the pen speed is used to modulate the envelope width, and the axial pressure is represented by various colors applied to the speed-broadened trace to provide a visual display of the handwriting and two dynamic parameters.

The time parameter may also be displayed. This may be accomplished by inserting markers in the display at regular time intervals. A shape may be selected for these inserted markers, for example an arrowhead shape, to indicate the direction of pen motion. Preferably, in order to preserve a representation of the actual trace of the stylus on the digitizer, a thin line of contrasting color or gray tone is displayed along the axis of the symmetrically broadened band, indicative of the pen trace.

Pauses of the pen as it traces across the surface may be represented by a symmetric pattern centered at the pause location and having a size related to the duration of the pause. For example, a circle may be displayed centered on each point where there is a pause, where the radial extent of the circle represents the duration of the pause. In addition, the duration of each pause may be displayed with a number displayed in conjunction with the symmetrical pattern, or a key of circle sizes representative of the delays may be provided on the display to allow the user to gauge the pause duration. The display may also include an outlining of the broadened trace that helps establish the pen motion for overlapping trace areas as described below. Additionally, the tilt of the stylus in relation to the surface may be displayed as a parameter in digitizers providing such information.

Finally, the display may include a representation of pen motion above the paper but in proximity to the surface, for example when the pen is lifted momentarily from the paper in the handwriting process. This representation can make use of any of the methods described above. In a preferred embodiment, pen motion above but in proximity to the paper is represented as a continuation of the thin line used to display the actual writing that is centered within the symmetrically broadened band that exists when the pen is in contact with a digitizer, but is not present when the pen is lifted from the digitizer. Accordingly, the display of the thin line alone indicates motion of the pen above but near the digitizer surface.

Figure 2A:
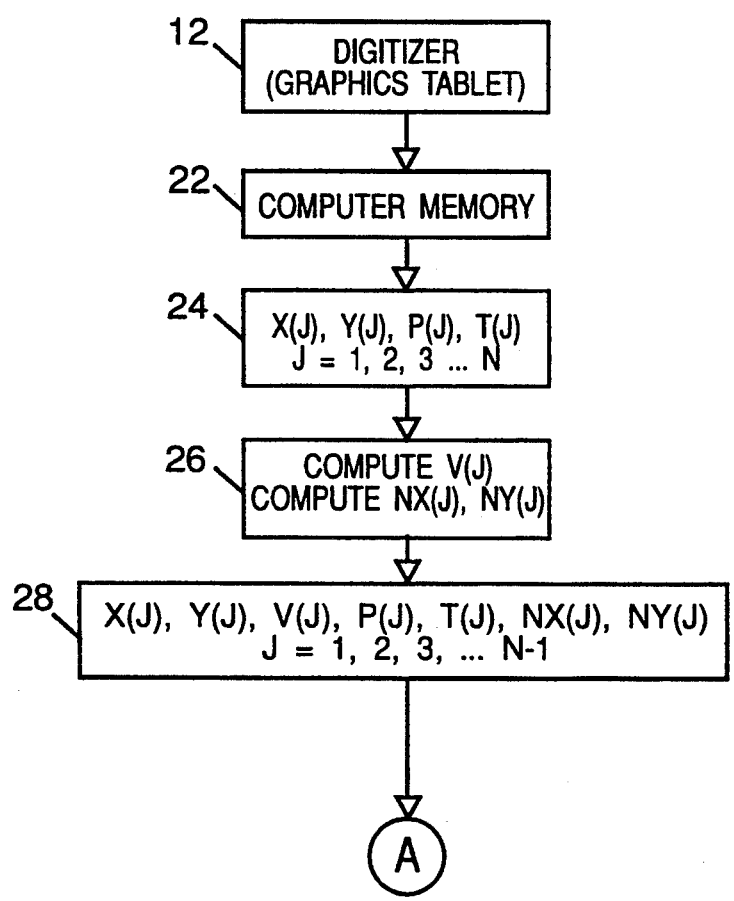
FIG. 2 is a flow chart of the software embedded within the system of FIG. 1 for accomplishing this invention.
Figure 2B:
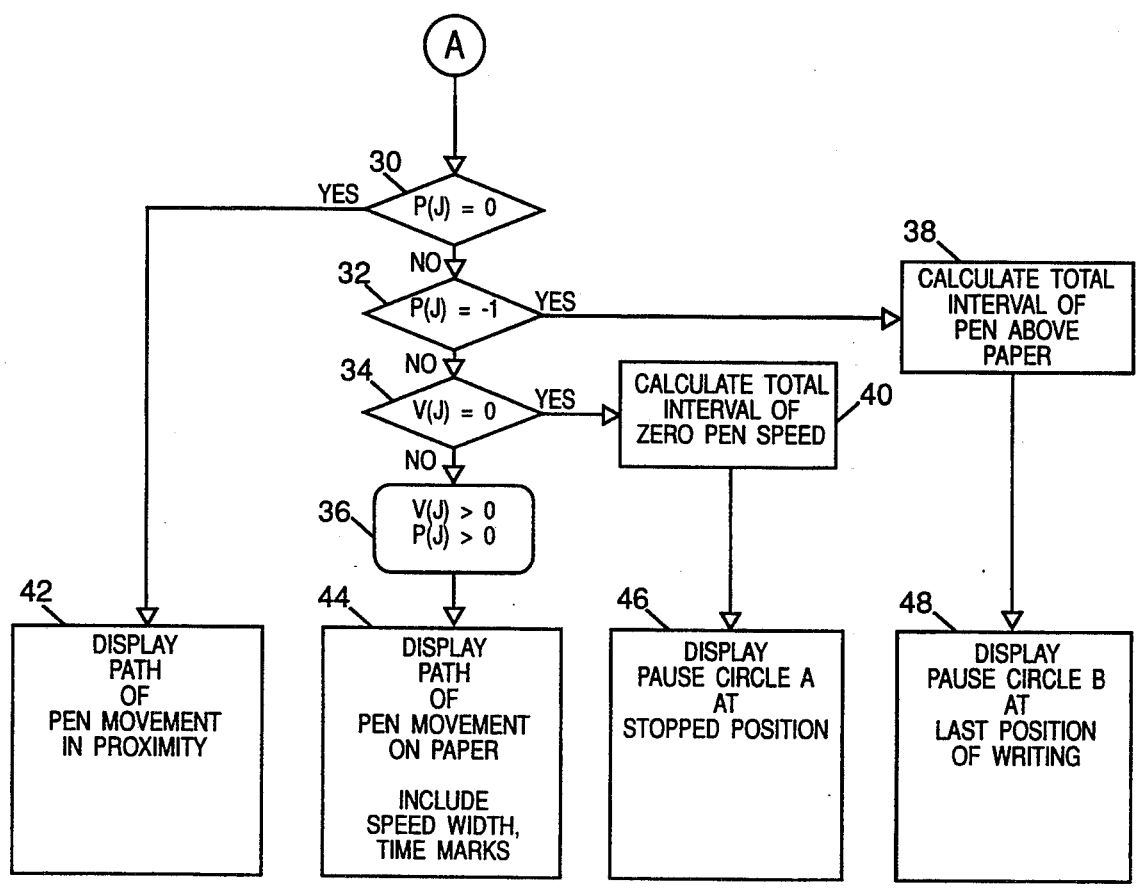

A flow chart of software 50 for accomplishing the above objectives in the system of FIG. 1 is shown in FIG. 2. Digitizer 12 provides pen position coordinates and the axial pen force to memory 22. In FIG. 2, the X and Y pen position coordinates are labelled X and Y, respectively, and axial pen force is labelled as P. At step 24, a table of sample parameters is prepared having three columns and N rows for the N sample points. When the pen is out of contact with the tablet, rows are inserted with a pressure of $-1$ for each of the sampling intervals.

At step 26 the computer calculates the tangential pen speed $v(j)$ and unit vectors normal to the pen velocity, components $nx(j)$ and $ny(j)$. In step 28, a final data table is prepared which contains the sample pen coordinates and pen pressure that belong with the pen speed and pen velocity components. If the pen is not in contact with the tablet, but in proximity ($p(j)=0$), step 30, and when the pen is out of proximity ($p(j)=-1$), step 32, the system calculates the total interval of the pen above the paper, step 38, and displays a pause circle at the last position of the pen on the tablet, step 48. If the pen is touching the paper but the velocity vector is zero, step 34, the computer calculates the total interval of zero pen speed, step 40, and displays a different type of pause circle at that stopped position, step 46. When there is both pen axial pressure and velocity, step 36, the computer displays the path of the pen movement on the digitizer surface with a thin trace and a broadened envelope centered on the trace whose width is modulated by the calculated speed. Also displayed are time marks such as arrowheads showing the direction of movement at regular time intervals to divide the display into interval lengths. When the pen is not touching the tablet but is in proximity to the tablet and so its position is sensed, the path of the pen movement in proximity to the tablet is displayed, step 42.

Figure 3A:
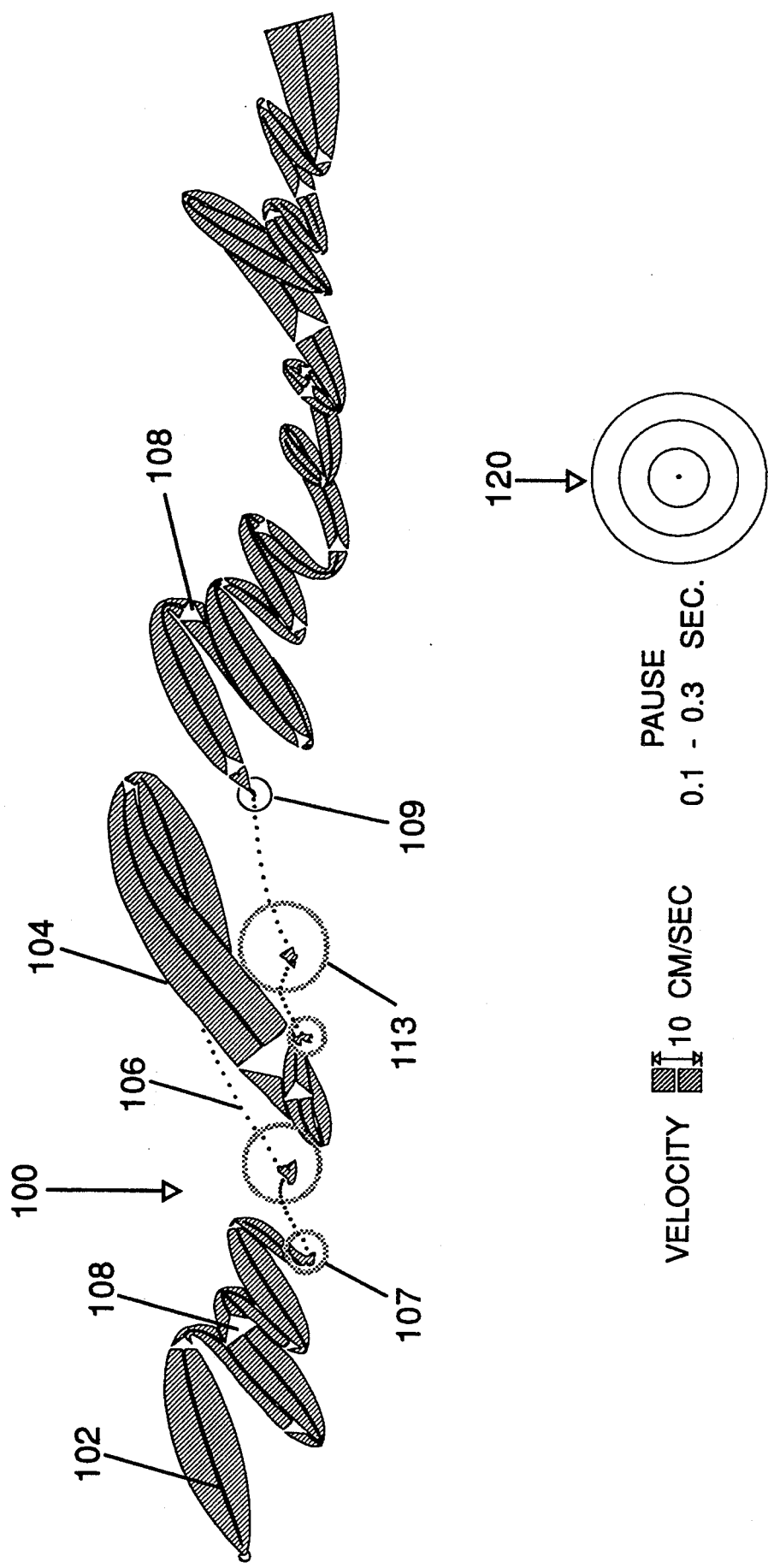

FIG. 3A shows an example of an output for a signature in which display 100 includes thin white line 102 that displays the trace of the actual movement of the tip of the stylus across the digitizer surface. Broadened display envelope 104, symmetric about line 102, displays a representation of the speed of the pen across the surface. The broadening may be accomplished by calculation of lines normal to trace segments having a length related to pen speed. The system then connects the line endpoints and fills in with black; gray scale or colors can also be used for display of another dynamic parameter. Trace areas such as area 106 not having this broadening indicate that the pen was moving near the surface but not in contact with the surface. Time marks 108 are inserted at regular intervals to provide a time base for an additional comparison parameter. These marks may be arrowheads, as shown, to also indicate the direction of pen movement. Display portion 120 is a key of the circle sizes for pen pause times of 10 to 50 milliseconds related to increasing circle diameter, respectively. Solid circle 109 is a pause with the pen touching the paper. Gray circles 107 and 113 indicate the total interval of the pen above the paper. White envelope outline 111 is provided to differentiate pen motion in areas where the envelopes overlap. The display also includes a calculation of the maximum pen speed (16.3 cm/sec), the total writing time (3.8 sec) and the total pause time (0.5 sec).

A forged copy of signature 100, FIG. 3A, is displayed in FIG. 3B. Signature 121 includes a display with the same parameters. The displays in both FIGS. 3A and 3B have been enlarged by 375% to allow a more exact comparison of the two signatures. This comparison reveals that not only is trace line 102a slightly different than original trace line 102, but that the velocity broadened display envelope 104a is vastly different from that of 104 of original signature 100, FIG. 3A. Broadened line 104a is extremely thin, indicating that the pen was moving relatively slowly across the surface (9.7 cm/sec maximum speed), as may commonly occur when the signature is being copied by a forger. In addition, there are a number of long intervals, such as intervals 107a and 113a, where the stylus was off the paper. Additional pauses such as pauses 131 and 133 indicate that the forger stopped the pen motion at several points along the trace for times of up to approximately 15–20 milliseconds. Accordingly, the system and method of this invention provide the ability to compare handwriting samples based not only on the display of the movement of the pen across the surface, but also one or more dynamic parameters associated with the handwriting process, including pen velocity, pressure, tilt, movement on and above the paper, pauses, and time in relation to writing segment length, thereby providing additional data for more exact comparison than has presently been available.

Figure 4:
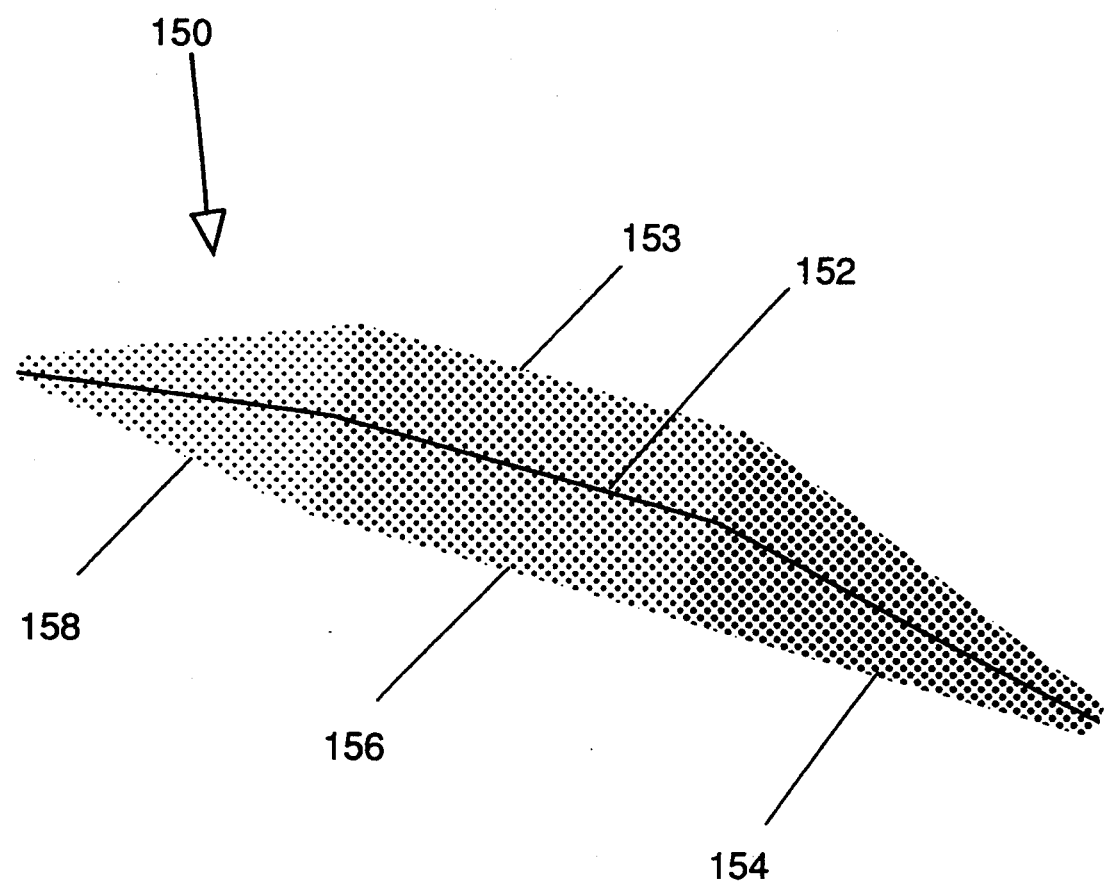
FIG. 4 is a similar example for a handwriting stroke illustrating other display parameters of this invention.

FIG. 4 illustrates color or gray-scale display of the broadened trace to indicate a second dynamic parameter, typically pen pressure. Output portion or stroke 150 includes trace 152 surrounded by symmetric speed-modulated envelope 153. In this example, a second parameter, such as pressure, is displayed as areas of different color or gray-scale, 158, 156 and 154. Typically, the available colors or shades of gray are assigned to different pressure ranges.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of displaying handwriting and handwriting parameters from movement of a stylus across a surface, comprising:

resolving the tangential speed of the stylus tip as it moves along a trace across the surface;

recording on a record member the stylus trace as a thin line; and recording an envelope, which is visually distinguishable from the thin line, on the record member along and about the thin line, in which the width of the envelope is modulated in proportion to the stylus tangential speed to visually indicate the stylus tangential speed, for displaying both the handwriting and the stylus tangential speed.

2. The method of claim 1 in which the record member includes a printer.

3. The method of claim 1 further including determining the pressure of the stylus on the surface.

4. The method of claim 3 further including recording on the record member, along the thin line, a representation of the pressure of the stylus tip as it moves along the trace across the surface.

5. The method of claim 4 in which recording the representation of the pressure includes assigning display colors to represent pressure values.

6. The method of claim 4 in which recording the pressure includes assigning display gray shades to represent pressure values.

7. The method of claim 1 further including determining the location and duration of pauses of the stylus as it moves across the surface.

8. The method of claim 7 further including recording the pauses on the record member.

9. The method of claim 8 in which recording the pauses on the record member includes displaying a symmetric pattern around the pause locations.

10. The method of claim 9 in which displaying a symmetric pattern includes representing the pause duration with the size of the symmetric pattern.

11. The method of claim 9 in which the symmetric pattern is a circle.

12. The method of claim 1 further including determining the motion of the stylus just above the surface.

13. The method of claim 12 further including recording on the record member the motion of the stylus just above the surface.

14. The method of claim 1 further including determining the tilt of the stylus in relation to the surface.

15. The method of claim 1 further including outlining the envelope to indicate stylus direction in overlapping envelope areas.

16. The method of claim 1 further including recording on the record member as a second thin line a previous stylus trace, and a second envelope which is visually distinguishable from the second thin line along and about the second thin line, in which the width of the second envelope has been modulated in proportion to the stylus tip tangential speed along the previous stylus trace to visually indicate the previous stylus trace and the stylus tip tangential speed, to allow visual comparison of two handwriting samples.

17. The method of claim 1 in which the record member includes a video display device.

18. A system for displaying handwriting and handwriting parameters from movement of a stylus across a surface, comprising:

means for resolving the tangential speed of the stylus tip as it moves along a trace across the surface;

means for recording on a record member the stylus trace as a thin line; and means for recording an envelope, which is visually distinguishable from the thin line, on the record member along and about the thin line, in which the width of the envelope is modulated in proportion to the stylus tangential speed, for displaying both the handwriting and the stylus tangential speed.

19. The system of claim 18 in which the record member includes a printer.

20. The system of claim 18 further including means for determining the pressure of the stylus on the surface.

21. The system of claim 20 further including means for recording on the record member along the thin line a representation of the pressure of the stylus tip as it moves along the trace across the surface.

22. The system of claim 21 in which said means for recording the pressure includes means for assigning display colors to represent pressure values.

23. The system of claim 21 in which said means for recording the pressure includes means for assigning display gray shades to represent pressure values.

24. The system of claim 18 further including means for determining the location and duration of pauses of the stylus as it moves across the surface.

25. The system of claim 24 further including means for recording the pauses on the record member.

26. The system of claim 25 in which said means for recording the pauses on the record member includes means for displaying a symmetric pattern around the pause locations.

27. The system of claim 26 in which said means for displaying a symmetric pattern includes means for representing the pause duration with the size of the symmetric pattern.

28. The system of claim 26 in which the symmetric pattern is a circle.

29. The system of claim 18 further including means for determining the direction of motion of the stylus just above the surface.

30. The system of claim 29 further including means for recording on the record member the direction of motion of the stylus just above the surface.

31. The system of claim 18 further including means for determining the tilt of the stylus in relation to the surface.

32. The system of claim 18 further including means for outlining the envelope to indicate stylus direction in overlapping envelope areas.

33. The system of claim 18 further including means for recording on the record member as a second thin line a previous stylus trace, and a second envelope which is visually distinguishable from the second thin line along and about the second thin line, in which the width of the second envelope has been modulated in proportion to the stylus tip tangential speed along the previous stylus trace to visually indicate the previous stylus trace and the stylus tip tangential speed, to allow visual comparison of two handwriting samples.

34. The system of claim 18 in which the record member includes a video display device.

* * * * *